United States Patent [19]

Pauliukonis

[11] Patent Number: 4,570,669

[45] Date of Patent: Feb. 18, 1986

[54] SIMPLIFIED SPRINGLESS CHECK VALVE

[76] Inventor: Richard S. Pauliukonis, 6660 Greenbriar Dr., Cleveland, Ohio 44130

[21] Appl. No.: 674,963

[22] Filed: Nov. 26, 1984

Related U.S. Application Data

[63] Continuation-in-part of Ser. No. 410,870, Aug. 24, 1982, Pat. No. 4,501,289.

[51] Int. Cl.[4] .............................................. F16K 15/00
[52] U.S. Cl. .................................... 137/528; 137/533; 251/900
[58] Field of Search ....................... 137/528, 533, 541; 251/DIG. 1

[56] References Cited

U.S. PATENT DOCUMENTS

| | | | |
|---|---|---|---|
| 1,294,014 | 2/1919 | Worster | 137/533 |
| 2,912,002 | 11/1959 | Miller | 137/541 |
| 4,257,443 | 3/1981 | Turney | 137/541 X |

FOREIGN PATENT DOCUMENTS 118138  4/1900  Fed. Rep. of Germany ...... 137/528

*Primary Examiner*—Robert G. Nilson
*Attorney, Agent, or Firm*—R. S. Pauliukonis

[57] ABSTRACT

Disclosed is an improved check valve for in-line mounting with fluid conduits under pressure subject to directional flow control of the type comprising two components of simple configuration, the improvement including a tee shaped movable short valving pin with a seal secured adjacent pin head over a shank thereof inserted inside a small divider bore portion central to a housing bore with larger diameter end sections and adaptable to fluid flow control therebetween from a first direction by closing the fluid flow passages when the seal is forced against a first side of the divider wall inside a first bore section rendering valve bubble-tight shut until the directions of fluid changes shifting the pin with the seal axially away from the divider as far as the tee permits before abutting a second side of the divider wall inside a second bore section so as to render valve fully open, and vice-versa, including novel means for pin assembly and holding physically inside the housing bore by an elastomeric seal inserted over the pin shank through the opening of the first bore section while the tee remains inside the second bore section during the initial valve assembly.

12 Claims, 4 Drawing Figures

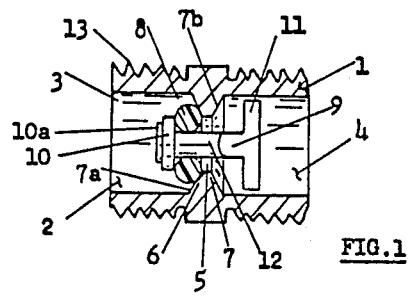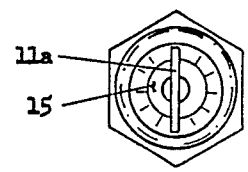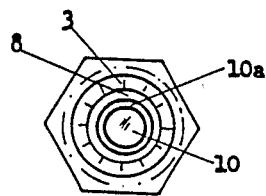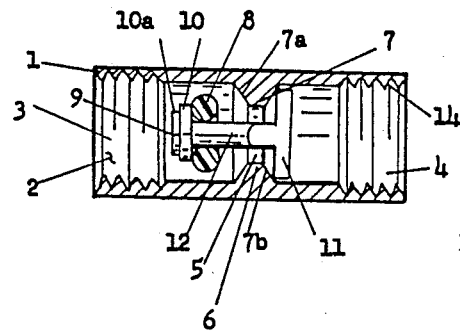

SIMPLIFIED SPRINGLESS CHECK VALVE

This is a continuation-in-part of my copending application Ser. No. 06/410,870 filed Aug. 24, 1982 now U.S. Pat. No. 4,501,289.

This application relates to directional flow control valves in general and to check valves in particular.

Specifically, this invention relates to springless check valves, limited in number in designs that employ floating valving means responsive to fluid pressure for closing or opening flow passages subject to directional changes of fluid flow.

A review of background art indicates that there are no check valves of this general type in existance. According to survey made by Pneumatics/Hydraulics, March 1984 issue on check valves representing the state-of-the-art situation, there is not a single valve listed that is of springless floating design.

Therefore, a major object of this invention is to provide a springless check valve adapted to directional flow control by application of fluid dynamics coupled with floating valving means responsive to fluid pressure.

Further object is to present a very simple design that incorporates two component construction for reduction of costs in the manufacture of such valves.

Finally, it is a further object of this invention to employ an elastomeric seal for dual function that of valve sealing and also physically retaining the valving member inside valve housing.

While the specification concludes with claims particularly pointing out and distinctly claiming the subject matter which is regarded as the invention, it is believed that the invention, objects, features, and advantages thereof will be better understood from the following description taken in connection with accompanying drawings in which like parts are given like identification numerals, and wherein

IN THE DRAWINGS

FIG. 1 is a cross sectional view of the springless check valve for in-line mounting by external threads shown on the outside diameter thereof, and with valve bubble-tight shut;

FIG. 2 is a cross sectional view of identical check valve as in FIG. 1 except for mounting threads on inside diameter of the bore and with valve fully open;

FIG. 3 is an end view of the valves shown in FIGS. 1 and 2 identifying valving pin with a tee exposed;

FIG. 4 is an end view of the valves of FIGS. 1 and 2 identifying pin head exposed.

As FIG. 1 and FIG. 2 illustrates, the check valve includes a valve housing 1 with a bore 2 passing therethrough between the ends thereof and provided with a first and a second larger diameter bore sections 3 and 4 interconnected by a small opening 5 in a centrally spaced divider 6 with a wall 7 which may be conical or tapered for an automatic centering of a seal 8 secured at a first end of a valving pin 9 provided with a head 10 that is positioned inside the larger diameter bore-end-section 3 while a second end of pin 9 provided with a flattened tee 11 for limiting an axial movement thereof is positioned inside the larger diameter bore-end-section 4.

Check valves of FIG. 1 and FIG. 2 therefore are identical in the basic principle of valving which controls fluid flow therethrough when fluid under pressure is delivered to the ends of housing 1 adaptable of in-line mounting into a fluid conduit by either external threads as those shown in FIG. 1 or internal threads as illustrated in FIG. 2. As can be seen from FIG. 1 which shows seal 8 abutting a first side 7-a of wall 7 of the divider 6 so as to completely cover the small opening 5, the valve becomes bubble-tight shut when pressurized fluid entering housing end provided with bore section 3 exerts a pressure force over seal 8. In fact, the larger is the pressure, the better is the seal until the direction of fluid flow changes from the first valve closed position of FIG. 1 to a second valve open position identified by FIG. 2.

FIG. 2 clearly identifies valve in the second open position with tee 11 abutting a second side 7-b of wall 7 of the divider 6 when pressurized fluid entering housing end provided with bore 4 exerts a pressure force over seal 8 from an opposite direction to the direction of FIG. 1 moving pin head 10 inside bore section 3 as far left as the tee 11 inside bore section 4 permits to render valve open with fluid communication between bore sections 4 and 3 respectively via small opening 5 which contains reduced diameter pin shank 12 terminating with flattened tee at the end thereof to insure maximum flow therethrough until the direction of fluid flow becomes changed again rendering valve closed per FIG. 1, and vice-versa.

FIG. 2 further serves to illustrate novel features of seal mounting over shank 12 which protrudes inside the first bore section 3 far enough to permit sliding of seal 8 over pin head 10 into position shown in FIG. 2 using proprietary technigues with simple tools associated with the initial valve assembly. A head recess 10-a in front of the pin serves as a centering point for such assembly tool adaptable of seal stretching enroute into a position uninterrupted between the head 10 and the first side 7-a of wall 7 of the divider 6 using a tapered seal holder and a hollow mandrel as a push rod for placing seal 8 across head 10 while pin 9 is firmly help by tee 11 from the opposite side of the divider 6 through the second bore-end-section 4. In turn, this single step of seal assembly constitutes also simplified mounting of the pin 9 inside small opening 5 and holding said pin 9 inside the valve housing 1 physically during the service life of such valves. The fundamentals of this rather unique simple step for valve simplification lie in the basic design parameters. A selection of two component construction means less cost and improved valve operation. By making the valving pin 9 with head 10 large but smaller than the diameter of opening 5 of the divider 6 and the tee 11 larger than the opening 5 while the shank 12 is considerably smaller than the opening 5, new and unexpected result has materialized with unique potentials, indeed. First, we can produce the valve housing 1 with the concentric bore portions 3 and 4 of larger diameter of equidistant length inside thereof while the divider 6 becomes a stop for a simple shouldered drill entering the housing inwardly from either housing end without the need for tool change leaving a taper on wall 7 shown in both FIGS. 1 and 2 as conical with little cost in machining. In fact, by injection molding from plastics, we can produce these housings even cheaper, and selectively provide the second side 7-b of wall 7 flat (not shown) to serve as a stop for tee 11 which is shown with flat edges, while the first side 7-a of wall 7 may be conical as shown in FIGS. 1 and 2 to facilitate an automatic centering of the seal in service. For in-line valve mounting into a conduit or piping circuit the housing 1 can be either externally threaded as shown by 13 in FIG. 1 or internally threaded as shown by 14 in FIG. 2, a choosable parameter that has little to do with the invention.

Second, we can produce the pin 9 by injection molding in one piece very inexpensively as a second component of this valve. By inserting pin 9 through bore end section 4, pin head 10 first, until it passes opening 5, comprising a small diameter bore portion of bore 2, so as to protrude into the bore end section 3 for mounting seal 8 over shank 12 not only valve assembly is completed but also flow passages with large openings are insured. This is so primarily because of ample space pipe size standards entail. According to calculations the flow coefficient, $C_v$ that can be built-in into the FIG. 1 and FIG. 2 envelops permitted by standard pipe sizes ⅛ to ½" NPT (Nat'l Pipe Threads) may range between $C_v=0.15$ to 2.0 which is consistent with flow requirements for small valves, although the design is not limited thereto. Larger sizes may be produced using seals with stronger physical properties. In fact, seal 8 shown as an O-ring may be replaced by a rectangular section cut out of a tubing or otherwise produced in a different shape than that shown in FIG. 1 and FIG. 2 to serve with equal success in larger size check valves, in particular if polyurethane elastomer with very large shear strength is employed with such valves. The use of U-cup is also envisioned in check valves of this general type.

Finally, the design as presented in FIG. 1 and FIG. 2 in cross section and in FIG. 3 and FIG. 4 as end views from either housing end is not only simple to manufacture but also more efficient in operation. When pressurized by the fluid valved from the direction entering bore-end-section 3, pin 9 with seal 8 floats away from the position shown in FIG. 2 to that of FIG. 1 rendering valve bubble-tight shut until the direction of fluid is changed. When pressurized by the fluid valved from the opposite direction entering bore-end-section 4, pin 9 with seal 8 floats away from the position shown in FIG. 1 to that of FIG. 2 rendering valve fully open with fluid communication fully established between bore-end-sections 4 and 3 via central opening 5 of the divider 6 due to prevailing pressure and drag forces fluid exerts over exposed surfaces of valving pin 9, and vice-versa. The unit operation is springless due to fluid dynamics which permit closing and opening of the valve with minimum energy loss, contrary to spring biased valve losses in systems subject to flow reversals with directional control. Ergo, the efficiency in the use of springless check valves with floating valving means of the present invention is insured, unless floating is eliminated in special applications using U-cup seals. FIG. 3 showing the endview of valves of FIGS. 1 and 2 identifies large flow annulus 15 between shank 12 and opening 5 of divider 6 and illustrates tee end 11-a which is flat to insure minimum obstruction to flow, when viewed from the second housing end provided with bore-end-section 4.

FIG. 4 showing the endview of valves of FIGS. 1 and 2 identifies seal 8 along with a concentric pin head recess 10-a in front of pin head 10 inside larger diameter bore section 3 when viewed from the first housing end.

In applications with systems requiring limited amount of flow, FIG. 2 may be modified to reduce the length of shank 12 to bare minimum while eliminating conical seats for seal 8 and tee 11 from sides 7-a and 7-b of divider wall 7 altogether so as to permit mounting of a U-cup seal instead of O-ring seal shown in FIGS. 1 and 2 adjacent flat wall 7-a snuggly. In turn, the fluid flow initiating with bore-end-section 4 will be restricted inside opening 5 to continue into the bore-end-section 3 for exhaust therefrom until the pressure force overcomes elastic resistance provided by U-cup body. The higher the pressure the larger the flow will result through the U-cup edges until full flow starts. While the invention is described in detail, it is obvious that modifications may be made by those skilled in the art without departing from the scope and spirit of the invention.

What is claimed is:

1. A simplified two component springless check valve comprising:

an elongated valve housing with a bore passing therethrough between a first and a second valve housing ends and provided with two opposing centrally divided interconnecting larger diameter bore-end-sections of equidistant length from said first and second housing ends towards a central wall provided with a coaxial reduced diameter interconnecting short bore portion in communication with said end sections for fluid flow therethrough when said valve is connected into a line of fluid under pressure by said first and second valve housing ends comprising fluid supply and exhaust port means respectively subject to directional flow control, a short, slightly elongated, axially movable pin inside said central bore portion having a shank of a diameter considerably smaller than the diameter of said central bore terminates at a first end thereof with a short round head of considerably larger diameter than said shank but smaller than the diameter of said central bore in order to pass therethrough during the initial assembly of the valve, while a second end thereof of tee configuration is flattened and provided with a tee of a size considerably larger than the diameter of said central bore in order not to pass therethrough during valve operation but smaller than the diameter of said bore-end-sections to facilitate free pin movement axially therein when subjected to pressure of fluid passing said tee unobstructed, means for mounting said pin into the center of said bore via said central wall through a second larger diameter bore-end-section so as to secure said pin inside thereof when said pin head extends into a first larger diameter bore-end-section by a seal of a diameter larger than the diameter of said central bore for securing permanently said seal over said shank after passing said pin head adjacent a first side of said wall inside said first bore-end-section while said tee of said pin remains inside said second larger diameter bore-end-section adjacent a second side of said wall so as to permit fluid flow freely into a first direction initiating with said second larger diameter bore-end-section and continuing into said first larger diameter bore-end-section via said central bore for exhaust therefrom until the direction of fluid flow is changed into an opposite second direction whereby fluid pressure urges pin movement so as to render valve bubble-tight shut when said seal is forced against said first side of said wall axially by said fluid pressure, and vice-versa, means for holding said pin by said seal in said valve housing physically when said seal is placed over said shank during valve assembly.

2. A simplified two component springless check valve comprising:

a single elongated valve housing unit with a central bore passing therethrough including two opposite larger diameter bore sections of equidistant length entering said bore inwardly from first and a second housing ends respectively towards a divider wall spaced substantially midway thereof, a coaxial smaller diameter central bore in said wall for fluid communication therethrough between said larger diameter bore sections, means for connecting said valve housing into a fluid circuit subject to directional flow control, including fluid supply and exhaust port means incorporated therein, a short valving pin with a slightly elongated shank terminating at a first end thereof with a short round head of a diameter considerably larger than said shank but only slightly smaller than the diameter of said central bore of said divider while a second opposite end thereof terminates with a flattened tee of a size which is larger than the diameter of said central bore but slightly smaller than the diameter of said larger diameter bore section, said pin being slidably received inside said central bore so as to protrude said wall of said divider in order to receive an elastomer seal of larger diameter than the diameter of said central bore placed over said shank by way of said round head thereof from said first housing end while said second pin end with said flattened tee remains inside said second housing end, said pin with said seal movable axially inside said bore in an operable relationship when subjected to fluid pressure between first and a second positions controlled by the direction of fluid flow, and when the fluid is allowed to enter said first housing end in the direction of said central bore towards said second housing end, said pin becomes shifted to a first valve bubble-tight closed position as a result of pressure effect over said pin head forcing said seal towards and against said divider wall until the direction of fluid changes, and when the fluid direction is reversed to enter said second housing end in the direction opposite said first direction, said pin becomes moved to a second valve open position by fluid pressure forcing said seal away from said divider wall as far as the tee of said pin allows permitting fluid communication between said second and first bore sections via said central bore, and vice-versa, said seal being mounted over said pin shank through said larger diameter bore section in a single step facilitating simplified assembly of the valve, said seal physically holding the pin within the central bore.

3. A springless check valve comprising:

a valve housing with a coaxial bore divided by a short centrally spaced wall provided with an interconnecting opening which is smaller than the diameter of outwardly passing larger end sections comprising fluid supply and exhaust port means depending on the direction of flow, means for interconnecting said valve housing into a piping system containing fluid under pressure, a valving pin with a short relatively thin shank including an enlarged pin head at a first end thereof while a second opposite end is provided with a large tee, flattened for reduced obstruction to flow, said pin spaced inside said wall opening, an elastomeric seal secured over said shank adjacent said head of said pin and a first side of said wall inside a first end section while said tee remains inside a second end section adjacent a second side of said wall, said pin with said seal inside said wall opening is adaptable to a directional flow control between a first valve closed and a second valve open positions, and when said first end section receives fluid under pressure, said pin with said seal is forced against said first side of said wall rendering valve bubble-tight shut until the direction of fluid becomes reversed, and when said second end section receives fluid under pressure, said pin with said seal is moved away from said first side of said wall as far as the tee of said pin will permit rendering the valve fully open, the vice-versa, reversing the flow again will render the valve bubble-tight shut for as long the direction of flow does not change, said pin being retained within said wall opening by assembly of said seal on said pin between the enlarged pin head and the first side of said wall.

4. A check valve as in claim 3 wherein said seal is of O-ring configuration with an outside diameter larger than the diameter of said wall opening while the inside diameter thereof is smaller than the outside diameter of said shank of said pin in order to insure proper sealing of the valve when said valve is closed.

5. A check valve as in claim 3 wherein said central wall is provided with conical seat configuration in said first and second sides thereof in order to insure automatic seal centering during the valve operation.

6. A check valve as in claim 3 wherein said first side of said central wall is tapered and adaptable of receiving said seal therein.

7. A check valve as in claim 3 wherein said shank is of uniform diameter which is considerably smaller than the diameter of said wall opening to insure large flow passage through an annulus formed therein between said shank and said wall opening.

8. A check valve as in claim 3 wherein said shank is of uniform diameter between said first and second ends thereof and of a length that permits pin floating when subjected to the directional fluid pressure.

9. A check valve as in claim 3 wherein said pin is plastic while said housing is metal.

10. A check valve as in claim 3 wherein said pin and said valve housing is plastic.

11. A check valve as in claim 3 wherein said pin and said valve housing are produced by injection molding to insure lower cost in manufacture.

12. A check valve as in claim 3 wherein said wall is provided with flat surfaces in said first and second sides thereof and said seal is mounted between said first wall and said pin head over said shank snuggly eliminating axial pin motion when subjected to directional fluid pressure in order to restrict free fluid flow when said valve is in said second valve open position so as to permit flow proportional to the pressure magnitude with partial flow-by through seal edges at gradually increasing fluid pressure until full flow is established when pressure force exceeds elastic resistance of the seal.

* * * * *